United States Patent Office 3,460,012
Patented Aug. 5, 1969

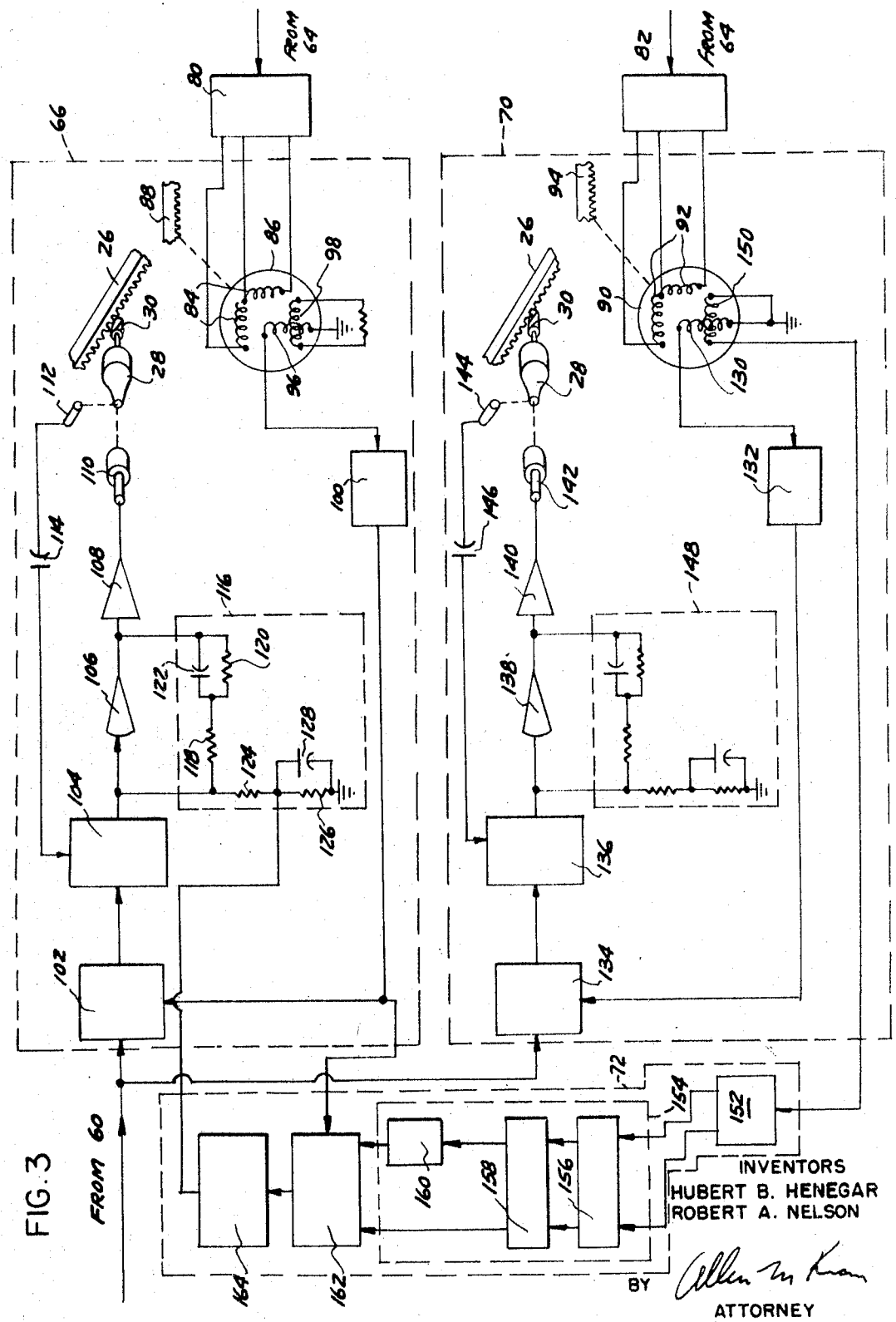

3,460,012
NUMERICAL CONTROL SYSTEM HAVING
PLURAL SYNCHRONIZED DRIVES
Hubert B. Henegar, Detroit, and Robert A. Nelson, Warren, Mich., assignors to The Bendix Corporation, a corporation of Delaware
Filed Mar. 22, 1965, Ser. No. 441,825
Int. Cl. H02p *1/54, 5/46, 7/74*
U.S. Cl. 318—18                    7 Claims

ABSTRACT OF THE DISCLOSURE

The cutter supporting gantry for a horizontal bed milling machine is moved along the bed by a pair of motors, one fixed to each gantry column. A numerical control system includes an interpolator operative to convert numerical distance commands from a punched tape into trains of command pulses. These pulses are employed, depending upon their sign, to advance or retard the count in a command counter flip-flop chain which has input from a constant frequency source. A reference counter chain, of the same length as the command counter, also has input from the constant frequency source. The reference and command wave forms from the last stages of the two counters are provided to each of two substantially identical closed loop servo systems which power the two gantry motors. Each of the servo systems includes a resolver with its rotor connected to detect motion between the gantry and the table. The resolvers are energized by the signals derived from the reference square wave and their outputs are each provided to detector-keyers which each compares the signal with the command wave form to derive an A.C. signal having an average value which is a function of the phase displacement between its two input signals. This signal is detected and amplified and used to power a hydraulic servo valve controlling fluid flow to one of the hydraulic gantry motors. The outputs of the two resolvers are also fed to another detector-keyer to generate a voltage which is summed with that provided by the detector-keyers in one of the servo loops. This "synchronizer" voltage forces the two gantry motors to provide output motions which are equal despite unequal loadings on the motors.

This invention relates to an electronic system for controlling the position of an output member or members from input data and more particularly to such a system wherein a plurality of output drive members must be driven in synchronism with one another.

Systems for controlling the position of an output member in accordance with input data are in common use. It is sometimes desirable that such systems employ two or more output drive members which must be moved in close synchronism with one another. For example, this technique may be required in a machine tool application where a heavy machine member such as a gantry is to be moved between controlled positions. In order to obtain smooth and accurate movement of such a member it may be desirable to apply driving power to it at a plurality of separated points. The output drive members may be controlled from a single information source and means must be provided to synchronize the power outputs so that load variations, valve unbalance, and other dissimilarities of the drives will not twist the driven member from its desired path.

The present invention has as its broad object to provide an electronic system wherein two or more output members drive a member or members in synchronism with one another from a single information source. While such control systems may take a variety of forms and may be energized by analog data as in a tracer system the present invention, in its narrower aspects, has particular reference to a phase analog system which operates from numerical data and the preferred embodiment of the present invention, which will subsequently be described in detail, pertains to such a system. The preferred embodiment is disclosed as applied to a gantry type skin milling machine. The gantry represents a heavy mass and it is necessary to employ a pair of synchronized powered drives disposed on opposite sides of the gantry. Each of the drives consists of a hydraulic servo-motor each of which power one of the gantry drives and a feedback element constituting a resolver. The resolvers are disposed in a phase analog servo-loop controlled by pulse trains received from a single digital controller. The controller is operated in accordance with numerical data introduced by tape or other record medium. The output of one of the two feedback resolvers, in addition to being fed back to its own servo-loop, is compared as to phase with the output of the other feedback resolver. Any difference in phase between the two resolvers is converted into a DC voltage and is summed with the control voltage for the servo-motor of the other drive. This voltage thereby acts to maintain the two servo-loops in synchronization with one another.

It is therefore seen to be an object to the present invention to provide an electronic position control system having two output members controlled from the same data wherein circuitry is provided to maintain the two drives in synchronism with one another, independently of the control data.

Another object is to provide such a system wherein the two output drives both constitute servo-motors disposed within independent servo-loops and means is provided for comparing the two outputs and varying the operation of one in order to maintain it in synchronism with the other.

Another object is to provide such a system wherein resolvers are provided as the feedback elements from the two servo-loops and means is provided for comparing the phase relation of the output of the two resolvers, for developing a correction voltage as a function of any place discrepancy and then applying that correction voltage to one of the servo-motors in order to maintain the two motors in synchronism.

Other objects, advantages and applications of the present invention will be made apparent by the following detailed description of a preferred embodiment of the invention. The description makes reference to the accompanying drawings in which:

FIGURE 3 is a block diagram of the two servo-loops of the control system illustrating their inter-connection.

Figure 1:
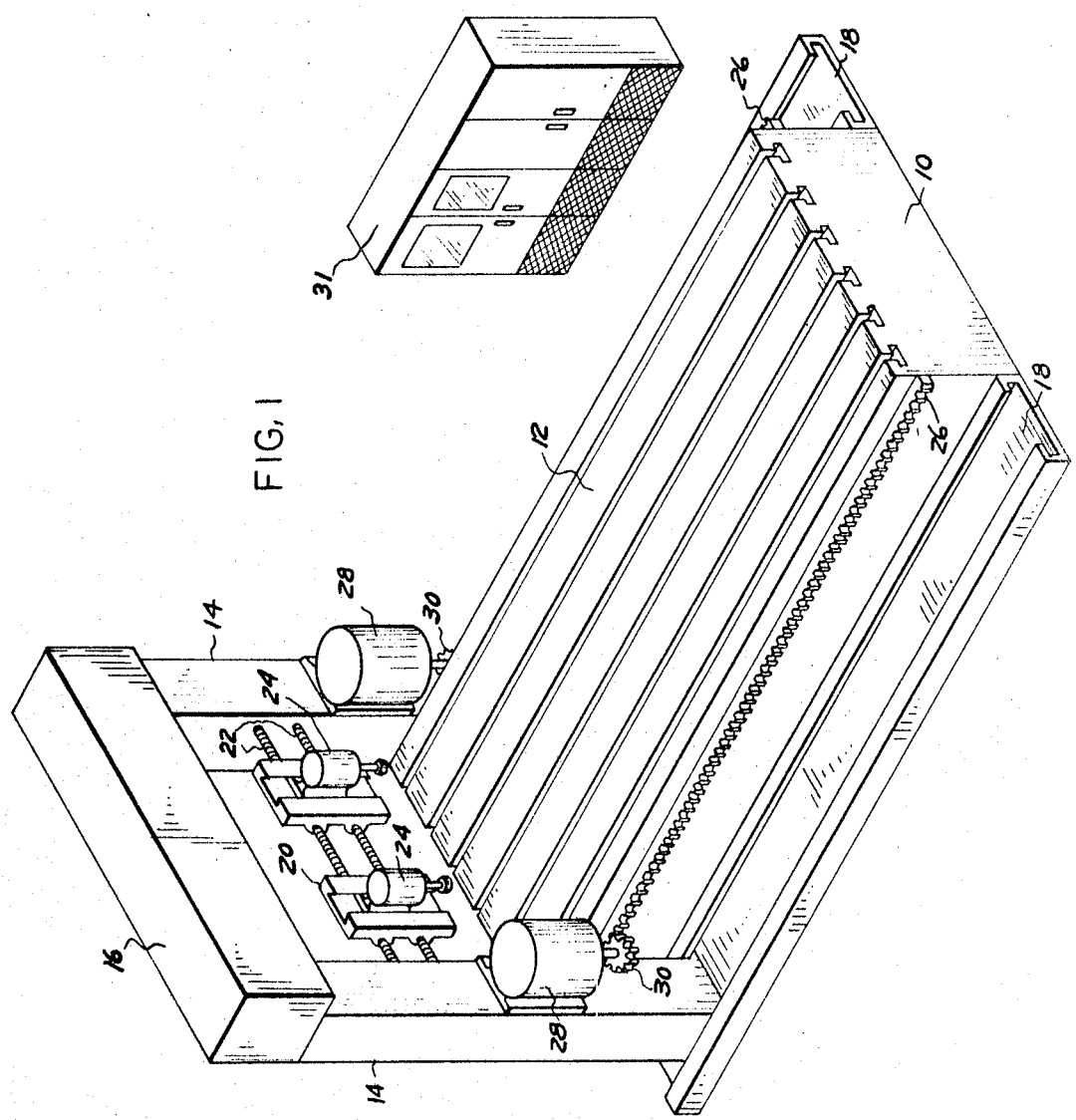
FIGURE 1 is a schematic perspective view of the gantry skin mill to which the preferred embodiment of the invention is applied illustrating the drive motors.

While systems formed in accordance with the present invention may be employed to control a wide variety of machines and mechanisms, the preferred embodiment of the invention is disclosed as controlling a gantry or bridge type mill as shown in FIG. 1. The mill is built about an elongated base 10 having a workbed 12 fixed to its upper surface. A gantry or bridge consisting of two vertical columns 14 and a cross member 16 connecting the upper ends of the columns straddles the width of the base. At their lower ends the columns 14 are slidably supported in ways 18 which extend along the length of the bed at both sides. The cross members 16 supports a pair of vertical slide members 20 which may be moved horizontally along the width of the cross members 16 by a screw mechanism 22. Each of the slides 20 supports a milling head 24 which moves vertically within the slide.

The control system of the present invention is adapted to move the gantry or the bridge lengthwise along the bed 12. In order to achieve this a pair of elongated racks 26 are mounted with their teeth extending in the vertical plane on each side of the bed. A pair of servo drive motors 28 are fixed to the columns 14 with their geared output members 30 engaging the two racks 26. Rotation of the motors thus causes the entire bridge member to move along the length of the base. It is clear that if only a single drive motor were employed in this mechanical arrangement the bridge might tend to twist out of squareness under certain loads. The two drive motors 28 apply power equally to the opposite sides of the bridge to produce a uniform motion.

It is essential that the outputs of the two drives 28 be closely synchronized with one another to prevent any cocking of the bridge and the broad object of the present invention is to provide a control system which will power the two motors 28 in locked synchronism with one another from a single information source. The further description will be confined to this control system which, in practice, would provide appropriate controls for other parts of the machine such as the milling heads 24. The control system is schematically represented in FIGURE 1 as being housed in a cabinet 31 and appropriately connected to the drive motors 28.

Figure 2:
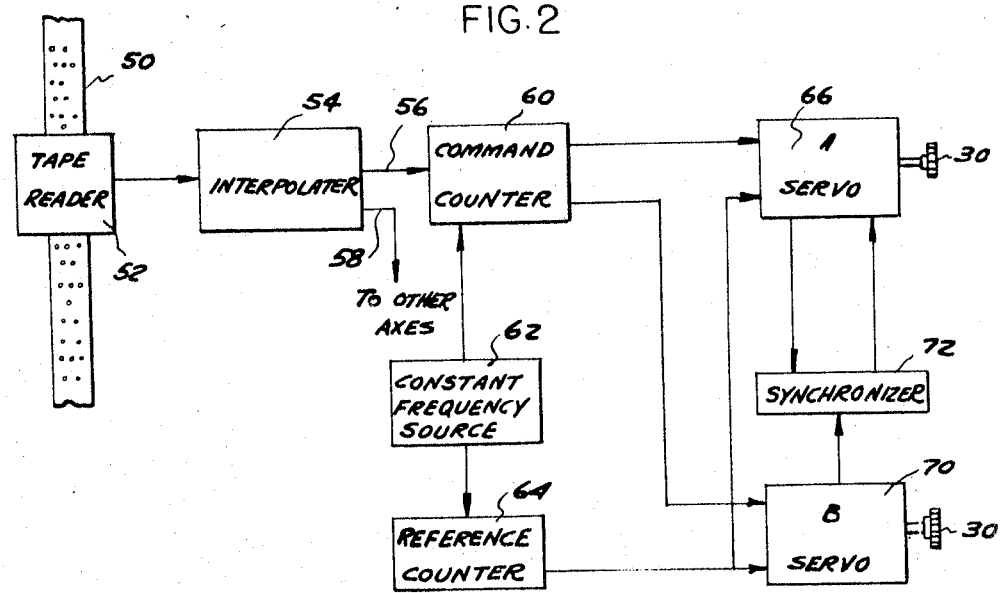
FIGURE 2 is a block diagram of the control system.
Figure 4:
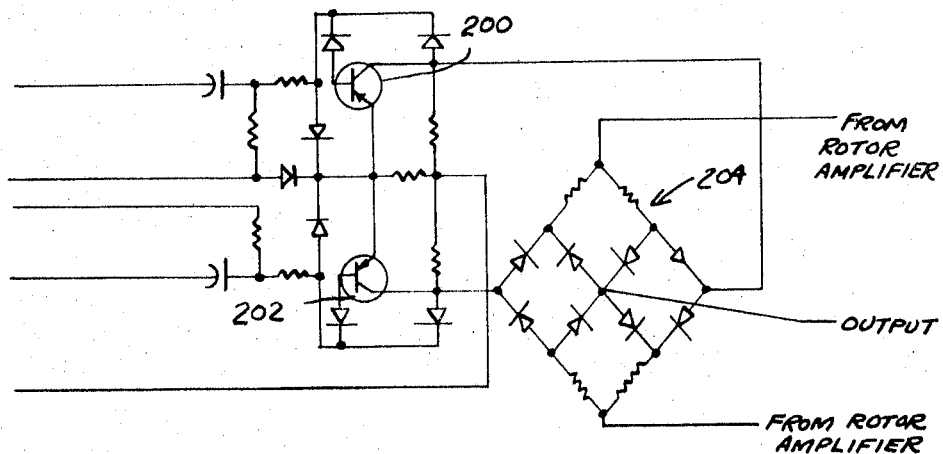
FIGURE 4 is a schematic diagram of the detector-keyers which are employed in the preferred embodiment of the invention to detect a phase difference between two input signals and to generate an output signal having a magnitude proportional to that phase difference.

The broad arrangement of the control circuitry for the two drive motors 28 is disclosed in FIGURE 2. In the preferred embodiment the information used to control the position of the output is encoded on a punched tape 50. A standard tape reader 52 converts the information of the tape 50 into electrical impulses which are provided to an interpolator 54. The interpolator (or controller) may be of the type disclosed in the United States Patent 3,002,115. It performs the function of generating trains of electrical pulses which trains include a number of pulses proportional to the total movement required of the output member and having instantaneous pulse rates equal to the instantaneous desired velocity of the output member. These pulses are provided to the subsequent control circuitry on the line 56 and to other axes which must be moved in timed relation to the motors 28 on line 58.

The pulses on line 56 are applied to a command counter 60 which also has an input from a constant frequency squarewave generator 62. This command counter may be of the type disclosed in United States Patent 3,011,110. Broadly, it acts as a dividing counter to provide an output constituting a squarewave having a frequency which is an integral divisor of the frequency of the source 62. The pulses provided from the interpolator on line 56 act to advance or retard the phase of the squarewave output from the counter 60 depending upon their sign. Thus, if the tape 50 calls for motion in a first direction the phase of the squarewave output of the command counter 60 may be advanced by some fraction of a cycle for each pulse received on line 56; if a motion in the opposite direction is called for by the tape each pulse from line 56 acts to retard the output phase of the command counter.

The constant frequency source 62 also provides its output to a reference counter 64. This reference counter simply acts as a dividing counter without the phase advance or the retard feature of the command counter 60. Thus its output acts as a reference by providing excitation to the resolvers against which the phase of the squarewave output of the command counter 60 may be compared to generate a control signal for the system.

The output of the command counter 60 is applied to one servo 66 which will be termed the A servo and to a B servo 70. Each of the servos 66 and 70 drives one of the output gears 30. The A servo 66 has a direct imput from the reference counter 64 as does the B servo. The A servo 66 and the B servo 70 are maintained in synchronism by a synchronizer unit 72. This unit has an input from B servo and both an input from and an output to the A servo. The more detailed novelty of the present invention lies particularly in the circuitry of the synchronizer and the manner in which it is coupled with the two servos. The circuitry of these units is disclosed in detail in FIGURE 3.

Referring to FIGURE 3 the square wave input from the reference counter 64 to the A servo 66 is applied through a shaper to a phase shifter 80 which converts it into two sine waves which are 90° out of phase. Similarly the input from the reference counter 64 to the B servo is applied through a shaper to a phase shifting unit 82 which performs the same function. The output of the phase shifter 80 is applied to a pair of stator coils 84 of a feedback resolver 86. The two coils 84 are displaced from one another by 90° physically and each one receives one of the 90° displaced sine waves from the phase shifter 80.

The rotor of the resolver 86 may be powered directly from one of the motors 28 or the resolver may be connected to its own instrument rack such as 88 which is fixed on the column along the path of the bridge and has a higher precision than the power rack 26. In either event the rotor of the resolver is moved in synchronism with the motion of one of the columns 14 with respect to the machine base.

In a similar manner a resolver 90 in the B servo 70 has a pair of windings 92 which are energized by the phase shifter 82. This resolver 90 is disposed on the other column 14 and is either powered by the rack 26 disposed on that column or by its own instrument rack 94. Each of the resolvers 86 and 90 has a pair of rotor coils which are also displaced by 90° with respect to one another. The two rotor coils of the resolver 84 are indicated at 96 and 98. The coil 98 is simply shorted out through a loading resistor while the output of the coil 96 is passed through an amplifier 100 and then provided to a detector-keyer 102. The detector-keyer also has an input from the command counter 60. It acts to compare the phases of its two inputs and to generate an A.C. signal having an average value which is the function of the phase displacement between the two input signals. This A.C. voltage is provided to a servo-filter 104 which extracts the D.C. value of the wave. The output is then provided to a preamplifier 106 and an amplifier 108. The output of this power amplifier 108 is applied to a servo valve 110 which controls the application of hydraulic fluid to the motor 28. The motor 28 also drives a feedback tachometer 112 which is connected into the servofilter 104 through a capacitor 114 to stabilize the feedback loop in a well known manner.

A network 116 shunts the preamplifier 106 to adjust the gain and the frequency characteristics of the loop. It includes a band pass filter comprising a series resistor 118 and a shunt resistor 120 disposed across a capacitor 122. Its gain adjustment includes a series resistor 124 and the shunt combination of a resistor 126 and capacitor 128 with the other end grounded.

One rotor 130 of the resolver 90 applies its output through an amplifier 132 to a detector-keyer 134 which has another input from the command counter 60. A servo-filter 136 generates the average D.C. value of the output of the detector-keyer and applies it to a preamplifier 138 and a power amplifier 140. The output of the power amplifier controls a hydraulic valve 142 which controls the flow of hydraulic fluids to the B servo-motor 28. A tachometer 144 feeding through a capacitor 146 connects to the servo-filter 136 to stabilize the loop. A gain and frequency network 148 completes the B servo.

The other winding 150 of the resolver 90 is not shorted but rather feeds to the synchronizer 72 where it is passed through a rotor amplifier 152 and a squaring and inverting circuit 154. The squaring and inverting circuit 154 comprises a clipper 156 which cuts the top off of the wave, an amplifier 158 which raises them to the original level, thus forming squarewaves, and an inverter 160 which inverts one of the outputs of the amplifier 158. The non-inverted output and the output of the inverter 160 are then applied to another detector-keyer 162. The other input to the detector-keyer is derived from rotor amplifier 100. The detector-keyer 162 again generates an A.C. voltage having an average value proportional to the phase difference between its two inputs. This is applied to a servo-filter 164 which derives the average value. The output of the servo-filter 164 is applied into the A servo-loop at the junction point between the resistors 126 and 128. The resistors thus act as a summing junction and the correcting voltage which represents the degree of desynchronization between the two motors 28 is summed with the servo-error provided by the filter 104. Thus the A motor 28 is driven into synchronism with the B motor. It should be recognized that the present invention is broad enough to encompass other methods of detecting lack of synchronism between the two driven motors and other methods of using this voltage to correct the situation.

The circuitry of the detector-keyers 102, 134, and 162 are substantially identical. Essentially the keyer consists of a pair of transistors 200 and 202 connected in a switching arrangement and controlled by one of the input squarewaves. The transistors switch a diode bridge which has sine waves as its input. If the phase of the squarewave is shifted by 90° with respect to the sine wave, the detector-keyer will provide a "chopped" sine wave output which has a zero D.C. value. The following servo-filters 104, 136, and 164 extract the average D.C. value of the output and provide it to the following servo amplifiers. If some other phase relationship exists between the two signals an asymmetrical wave will be produced which has a D.C. average value which is a function of the phase displacement.

The transistor 200 essentially amplifies the signal from one squarewave and the transistor 202 amplifies the other squarewave input. Each amplifier is driven between cutoff and full conduction by its input. The resultant squarewaves are applied to the diode switching circuit generally indicated at 204. When the key voltage is in one direction it essentially connects one of the second sine wave input lines from the rotor amplifier to the output line and when the voltage is in the opposite direction it connects the opposite one. The resulting chopped sine wave constitutes the output of the circuit.

Having thus described our invention, we claim:

1. In a control system, in combination: a source of numerical information; an interpolator operative to receive said numerical information and to generate a train of pulses encoded to represent particular parts of said numerical information; a source of constant frequency square waves; a reference counter operative to receive square waves from said source and said pulse train and to generate an output square wave having its phase advanced or retarded as a function of the input pulse train; a reference counter operative to provide an output square wave having a frequency which is an integral divisor of said constant frequency source; a first servo system having an output member and having as its inputs said command and reference square waves and being operative to control the motion of said output member is accordance with the phase difference between said reference and command square waves; a second servo system including an output member and having as its input said reference and command square waves and operative to control the output of said member in accordance with the phase difference between said reference and command square waves; means for comparing the outputs of said two output members; and means for modifying the output of one of the said two members in accordance with any difference between the motions of the two output members.

2. In a control system in combination:
a source of command signals; a first closed loop servo system including a first output member and a first feedback device operative to sense the motion of the first output member, to compare the motion of the first output member with that directed by the command signals and to move the first output member so as to equate its motion with that directed by the command signals; a second closed loop servo system including a second output member and a second feedback device operative to sense motion of the second output member, to compare the motion of the second output member with that directed by the command signals and to move said second output member so as to equate its motion with that dictated by said command signals; comparison means operative to receive the outputs of said two feedback devices and to generate an output signal having a property which is a function of the difference between the outputs of the two feedback devices; and means for applying the output signal of said comparison means to one of said servo systems in order to modify the operation of that servo system to bring its output motion into synchronism with the output of the other servo system.

3. The control system of claim 2, wherein the first and second feedback devices are each resolvers having the rotors connected to their respective output members and the comparison means operates to compare the phases of the wave forms generated by the two resolvers to generate an output signal having a property which the function of the phase difference between the outputs of the two resolvers.

4. The control system of claim 2, wherein the command signals constitute square waves with the command being coded in the phase of the square waves with respect to a reference square wave, and the first and second feedback devices constitute resolvers which are energized with either the command signals or the reference square waves.

5. The control system of claim 4, wherein each of the closed loop servo systems includes a comparison member operative to provide an output signal having a characteristic which is the function of the phase difference between the output of its associated resolver and whichever of the command signal or reference square waves which is not used to energize its associated resolver.

6. The control system of claim 1, wherein the first and second servo systems are each closed loop and control the output of their respective output members by comparing to motion to that coded in the command square waves to generate a signal which powers the output member.

7. The control system of claim 6, wherein the first and second servo systems employ comparison devices which generate a signal having a characteristic which is the function of the difference between the motion commanded by the input command and reference square waves and the motion actually produced by the output member, and use the signal to control the output member, and the means for modifying the output of one of said two members in accordance with any difference between the motions of the two output members comprises feedback devices operative to provide signals having characteristics which are a function of the motion of the output devices, means for generating a signal having a characteristic which is a function of the difference between the signals produced by two feedback devices, and means for summing such output signal with the output signals of the comparison devices in one of the servo systems.

References Cited

UNITED STATES PATENTS

| | | |
|---|---|---|
| 2,614,392 | 10/1952 | Bechberger et al. -- 318—19 XR |
| 2,830,243 | 4/1958 | Walcott _____ 318—28 |
| 3,054,039 | 9/1962 | Meredith. |
| 3,156,855 | 11/1964 | Righton et al. ____ 318—489 XR |
| 3,309,588 | 3/1967 | Martin et al. |

B. DOBECK, Primary Examiner

U.S. Cl. X.R.

318—19